United States Patent [19]

Moureaux

[11] Patent Number: 5,036,110

[45] Date of Patent: Jul. 30, 1991

[54] IMPERVIOUS RESILIENT MEMBRANE AND HYDROPNEUMATIC ACCUMULATOR FITTED WITH THAT MEMBRANE

[75] Inventor: Philippe Moureaux, Chartre de Bretagne, France

[73] Assignees: Automobiles Peugeot, Paris; Automobiles Citroen, Neuilly Sur Seine, both of France

[21] Appl. No.: 399,959

[22] Filed: Aug. 29, 1989

[30] Foreign Application Priority Data

Sep. 20, 1988 [FR] France ................................ 88 12274

[51] Int. Cl.[5] ................................................ B32B 3/02

[52] U.S. Cl. .................................... 121/137; 121/134; 121/95; 121/81; 121/139; 428/95; 428/304.4

[58] Field of Search ............... 428/95, 304.4; 521/134, 521/137, 81, 139, 143

[56] References Cited

U.S. PATENT DOCUMENTS 4,613,543 9/1986 Dabi .................................... 521/137

4,656,074 4/1987 Conley et al. ........................ 521/137

FOREIGN PATENT DOCUMENTS 1479485 5/1967 France .

1494473 9/1967 France .

2151371 4/1973 France .

2443622 4/1980 France .

2039616 3/1983 United Kingdom .

*Primary Examiner*—John Kight, III

*Assistant Examiner*—Duc Truong

*Attorney, Agent, or Firm*—Kenyon & Kenyon

[57] ABSTRACT

An impervious resilient membrane for fitting a hydropneumatic accumulator and consisting of a film having a thickness of 10–200 microns constituted by a graft polymer formed by the reaction of thermoplastic polyurethane with a copolymer of ethylene and vinyl alcohol, this film being arranged in sandwich-like fashion between two layers of thermoplastic polyurethane, the membrane being adapted to be mounted in an automotive vehicle suspension sphere to there define two chambers containing a gas and a liquid, respectively.

12 Claims, 1 Drawing Sheet

IMPERVIOUS RESILIENT MEMBRANE AND HYDROPNEUMATIC ACCUMULATOR FITTED WITH THAT MEMBRANE

The present invention relates essentially to an impervious resilient membrane or like diaphragm.

It is also directed to a hydropneumatic accumulator fitted with that membrane or diaphragm and used for instance in suspensions of automotive vehicles, which accumulator generally assumes the shape of a sphere separated by the membrane or diaphragm into two chambers or compartments one of which contains a gas such as nitrogen and the other one of which contains a liquid.

BACKGROUND OF THE INVENTION

It is known that membranes for pressure accumulators should exhibit both flexibility and imperviousness properties so as to allow a good transmission of pressures between both compartments containing the liquid and the gas, respectively.

There has already been proposed resilient membranes made from different materials and in this respect reference should be had for instance to the French patent application publication No. 2,443,622 and to the French patent No. 1,494,473.

However, the known membranes manufactured for instance from a thermoplastic material of the polyurethane kind exhibit an imperviousness to gases which is imperfect, which results after some years of use on a vehicle in a drop of the gas pressure prevailing inside of the sphere fitted with the membrane or diaphragm, so that the sphere has to be replaced to preserve the desired characteristic features.

On the other hand are known materials having a satisfactory imperviousness to gases such as nitrogen but the membrane flexibility then becomes unsatisfactory.

SUMMARY OF THE INVENTION

The object of the present invention is therefore to remove these inconveniences by providing a membrane for vehicle suspension spheres or brake systems, which owing to its particular consistency is an outstanding compromise between the properties of flexibility, liquid-tightness and imperviousness to gases.

For that purpose the invention has for its subject matter an impervious resilient membrane or diaphragm adapted in particular to fit a hydropneumatic accumulator and to be subjected on one side to the pressure of a gas and on the other side to the pressure of a liquid, this membrane comprising, in association, at least two materials and being characterized by a first material giving the membrane the required elasticity and selected among the thermoplastic polyurethanes, the block amide polyethers, the flexible polyesters or any mixture thereof and by a second material embedded into the body of the first material to provide the imperviousness to gases and selected among a copolymer of ethylene and vinyl alcohol, the polyamides, the polyvinylidene chloride or any mixture thereof.

Thus the membrane according to this invention would be yielding and flexible within a range of temperatures which may extend from −35° C. to +120° C., would be resistant to the hydraulic mineral liquid or to the brake liquid used on the vehicle and would advantageously exhibit substantially no perviousness to gases such in particular as nitrogen.

According to another characterizing feature, the membrane according to this invention results from a mixing of the aforesaid thermoplastic polyurethane with the aforesaid copolymer of ethylene and vinyl alcohol to produce a graft polymer according to the reaction:

$$\sim[\underset{\underset{O}{\|}}{C}-NH-R-NH-\underset{\underset{O}{\|}}{C}-O-R'-O]_n-\underset{\underset{O}{\|}}{C}-NH-R-N=C=O + HO-CH_2-CH_2-\underset{\underset{OH}{|}}{CH}\sim \longrightarrow$$

$$[\underset{\underset{O}{\|}}{C}-NH-R-NH-\underset{\underset{O}{\|}}{C}-O-R'-O]_n-\underset{\underset{O}{\|}}{C}-NH-R-NH-\underset{\underset{O}{\|}}{C}-O-CH_2-CH_2-\underset{\underset{OH}{|}}{CH}\sim$$

It should be specified here that in this membrane the proportion of the second material such as the ethylene-vinyl alcohol for instance with respect to the first material such as the thermoplastic polyurethane is lying between about 5% and 20%.

According to an embodiment of this invention the membrane consists of at least one film based upon the aforesaid graft polymer and having a thickness lying between about 10 microns and 200 microns and arranged in sandwich-like fashion between at least two layers of said first material.

Said film-like graft polymer results from a mixing of the first and second aforesaid materials in a proportion of 50% to 95% of the second material with respect to the first material.

According to another embodiment, the membrane consists of at least one film of said second material arranged in sandwich-like fashion between two layers of the aforesaid first material.

According to still a further embodiment, the aforesaid second material preferably consisting of a copolymer of ethylene and vinyl alcohol is blended with a third material selected among the polyamide 6, the block amide polyethers, the terpolymers of ethylene, of acrylic ester and of maleic anhydride or other polymers of the same type acting as an adhesive, in a proportion of 5% to 20% with respect to the second material.

According to still another embodiment, the membrane consists of at least one film constituted by the aforesaid second material or by a mixture of said second and third materials, said film being arranged in sandwich-like fashion between at least two layers of a material selected among a block amide polyether modified with a butadiene-styrene-acrylonitrile rubber, or a mixture of polyurethane and block amide polyether modified with a butadiene-styrene-acrylonitrile rubber.

According to a preferred embodiment the copolymer of ethylene and vinyl alcohol is incorporated into the polyurethane upon the polymerization of the latter to produce said graft polymer.

The membrane according to this invention may be obtained through molding of this graft polymer.

The invention is also directed to a hydropneumatic accumulator fitted with a membrane meeting any one of the above characterizing features and exhibiting a substantial gain in imperviousness to gases with respect to the known membranes and this without altering the indispensable qualities of yieldingness or pliability and flexibility of said membrane.

BRIEF DESCRIPTION OF THE FIGURES

The invention will be better understood and further objects, characterizing features, details and advantages thereof will appear more clearly as the following explanatory description proceeds with reference to the accompanying diagrammatic drawings illustrating a presently preferred specific embodiment of the invention by way of non limiting example only and wherein.

Figure 1:
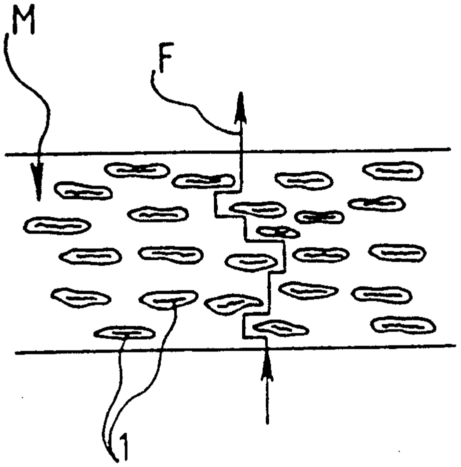
FIG. 1 is a diagrammatic view in section of the layer of graft polymer forming an integral part of the membrane according to this invention.

According to an exemplary embodiment an elastic and impervious membrane according to this invention consists of two different materials, namely:

a first material serving as a matrix and providing the membrane with the desired elasticity and yieldingness, easy possibilities of mounting and inflation within the sphere as well as with a good chemical resistance to the liquid within the sphere, which first material is selected among the thermoplastic polyurethane (TPU) the block amide polyethers (PEBA), the flexible polyesters or a mixture or blend according to various proportions of two or more of the above materials; and a second material embedded into the body or matrix formed of the first material and giving the membrane and outstanding imperviousness to gases in particular to nitrogen, which second material is selected among a copolymer of ethylene and vinyl alcohol (EVOH), the polyamides such as those known under the names PA6, PA6-6, PA11 or PA12, the polyvinylidene chloride (PVDC) or any mixture thereof.

DESCRIPTION OF THE PREFERRED EMBODIMENT

According to a preferred embodiment the proportion of the second material with respect to the first material used as a matrix is lying between about 5% and 20%.

The combination of the first and second aforesaid materials is carried out by mixing at a high temperature lying for instance between 150° C. and 250° C. This mixing may be carried out in a conventional mixer known under the name BUSS and commonly used in the industry of thermoplastic materials. The mixing may also be performed directly in the screw of a conventional press for injecting plastics materials, this press being used for the manufacture of the membrane. A metering hopper may in a known manner be associated with the press to provide a constant proportion of the second material with respect to the first material forming the matrix.

To make a membrane adapted to fit a vehicle suspension sphere it is preferable to use as a first material the thermoplastic polyurethanes (TPU) and also mixtures of thermoplastic polyurethanes and of blocks amides polyethers (TPU/PEBA) and as a second material the copolymer of ethylene and vinyl alcohol (EVOH).

Upon mixing both materials for a few minutes at 200° C. for instance a chemical reaction takes place between the thermoplastic polyurethane and the copolymer of ethylene and vinyl alcohol leading to the formation of a graft polymer according to the following reaction:

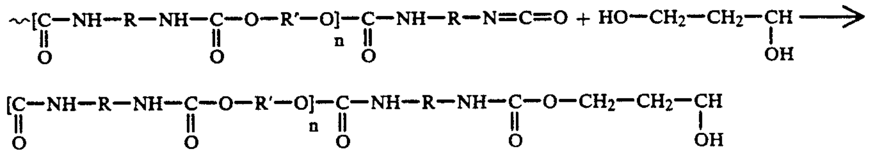

More specifically the grafting is obtained through the chemical reaction of the hydroxyles groups of the copolymer of ethylene and vinyl alcohol upon the isocyanates groups of the thermoplastic polyurethane.

Thus is produced a grafting of the macromolecular chain of the copolymer of ethylene and vinyl alcohol upon the macromolecular chain of the thermoplastic polyurethane.

This grafting reaction leading to the graft polymer has been substantiated by the following tests.

1. Thermogravimetric analyses (ATD/ATG)

Thermogravimetric analyses have been carried out respectively upon:

the thermoplastic polyurethane (TPU) known under the trade name DESMOPAN 385-BAYER, constituting the first material;

the copolymer of ethylene and vinyl alcohol (EVOH) constituting the second material; and the graft polymer resulting from the reaction of the thermoplastic polyurethane and of the aforesaid copolymer of ethylene and vinyl alcohol in respective proportions of 90% and 10%.

These analyses clearly show that the characteristic peaks of the copolymer of ethylene and vinyl alcohol, in particular the peak corresponding to the melting point at 172° C. have vanished when analyzing the graft polymer obtained, thereby proving that there has well been a chemical reaction between the thermoplastic polyurethane and the copolymer of ethylene and vinyl alcohol.

2. Analyses through chromatography in a gaseous phase

The analyses through chromatography in a gaseous phase carried out on the same materials as previously, namely the thermoplastic polyurethane, the copolymer of ethylene and vinyl alcohol and the graft polymer are confirming the results of the thermogravimetric analysis, namely that the characteristic peaks of the copolymer of ethylene and vinyl alcohol are not found in the graft polymer thereby confirming once more the grafting reaction.

3. Viscosity measurements with the capillary rheometer

Viscosity measurements with the capillary rheometer have been carried out at two different temperatures, 200° C. and 220° C. and at four different shearing speeds: 200 $s^{-1}$, 500 $s^{-1}$, 1,000 $s^{-1}$ and 3,000 $s^{-1}$ on the same materials as previously, namely the thermoplastic polyurethane, the copolymer of ethylene and vinyl alcohol and the graft polymer.

The viscosity measurements expressed in kilo.Pascal.-seconds (kPa.s) are stated in the following table.

TABLE 1

| Temperature °C. | 200° C. | | | | 220° C. | | | |
|---|---|---|---|---|---|---|---|---|
| Shearing speed ($s^{-1}$) | 200 | 500 | 1,000 | 3,000 | 200 | 500 | 1,000 | 3,000 |
| Thermoplastic polyurethane (TPU) | 2.98 | 1.05 | 0.54 | 0.19 | 1.17 | 0.52 | 0.16 | 0.06 |
| Copolymer of ethylene and vinyl alcohol (EVOH) | 1.01 | 0.50 | 0.31 | 0.15 | 0.43 | 0.30 | 0.21 | 0.12 |
| Graft polymer (90% TPU + 10% EVOH) | 2.48 | 1.09 | 0.58 | 0.25 | 1.32 | 0.058 | 0.28 | 0.11 |

The viscosity of TPU and EVOH has been measured on pellets before transformation whereas that of the graft polymer has been measured on parts, i.e. after transformation.

It is well known that the transformation of the thermoplastic materials may only cause the drop of the viscosity in view of the break of the macromolecular chains, this viscosity drop being in general of 5% to 15%.

Now it is seen on the table that the graft polymer has a higher viscosity especially at 220° C. than those of TPU and EVOH.

This may be accounted for only by the grafting of the macromolecular chains of the copolymer of ethylene and vinyl alcohol (EVOH) on the macromolecular chains of the thermoplastic polyurethane (TPU).

This grafting leads to the creation of new longer macromolecular chains constituting the graft polymer and resulting in a higher viscosity for this graft polymer since it is well known that the viscosities of the polymers are in correlation with the lengths of their macromolecular chains.

The Applicants have also carried out measurements of imperviousness to nitrogen (at 100° C.) on the thermoplastic polyurethane and on the graft polymer resulting from the reaction of 90% of thermoplastic polyurethane with 10% of copolymer of ethylene and vinyl alcohol.

The results of the measurements, given in the following table 2, show a gain in the imperviousness to nitrogen of the order of 50% thereby allowing to double the lifetime of the membranes according to this invention.

TABLE 2

| Material | Perviousness to nitrogen at 100° C. $m^2 \cdot Pa^{-1} \cdot s^{-1}$ |
|---|---|
| Thermoplastic polyurethane (DESMOPAN 385 of BAYER) | 145 |
| Graft polymer | 76 |

This gain in imperviousness results from the "labyrinth" effect produced by the graft polymer forming islets in the thermoplastic polyurethane matrix as is well seen on FIG. 1.

On this Figure, it is seen that a membrane M consisting of "impervious" islets 1 of copolymer of ethylene and vinyl alcohol grafted on the matrix constituted by the thermoplastic polyurethane. The islets 1 as well seen on the Figure are elongated in the direction of the extrusion of the membrane and the diffusion of the gas through the latter may take place only by passing round these islets as shown by the arrow F. In other words the length of the path to be travelled by the gas molecules is greatly increased thereby amounting to fictitiously increase the thickness of the membrane hence to greatly decrease the perviousness of the membrane to the gas.

Figure 2:
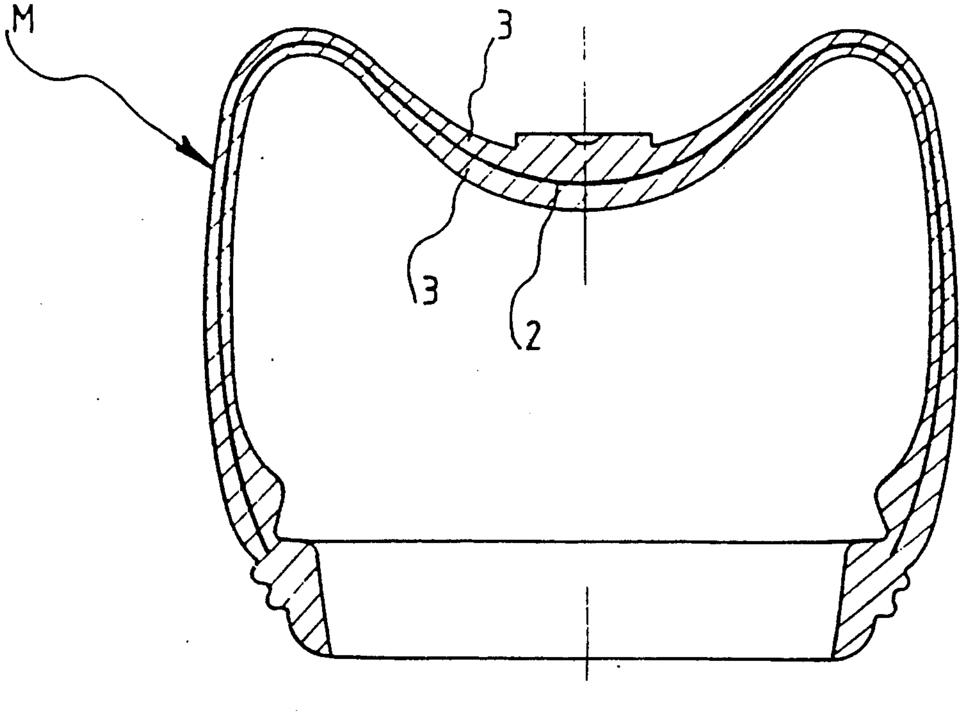
FIG. 2 is a view in section of an embodiment of the membrane according to the invention.

According to another embodiment shown on FIG. 2 the membrane M consists of at least one film 2 of graft polymer as previously explained, this film exhibiting a thickness lying between about 10 microns and 200 microns and being arranged in sandwich-like fashion between two layers 3 of said first material such as a thermoplastic polyurethane.

The manufacture of the membrane shown on FIG. 2 may be carried out by using a bi-material injection press commonly used in the industry of transforming thermoplastics.

The graft polymer forming the film 2 may be obtained through mixing of thermoplastic polyurethane for instance and of the copolymer of ethylene and vinyl alcohol (EVOH) in a proportion of 50% to 95% of EVOH with respect to the thermoplastic polyurethane.

This mixing may be performed in a few minutes at a temperature lying between 150° C. and 250° C. as previously explained. The film 2 as shown on FIG. 1 contains a large number of impervious islets forming a nearly impassible barrier to the gases. The very small thickness of the film 2 incorporated between both layers 3 is such that the membrane M which may have an aggregate thickness of 2 mm to 4 mm has not an excessive rigidity or stiffness and preserves all its yieldingness or pliability.

The gain in imperviousness of the membrane shown on FIG. 2 with respect to a conventional membrane made from polyurethane is of the order of 90% thereby amounting to multiply with 10 the lifetime of such a membrane fitting for instance suspension spheres for an automotive vehicle.

According to another embodiment the impervious film 2 may merely consist of the second material mentioned at the beginning of this description, namely a copolymer of ethylene and vinyl alcohol, a polyamide, the polyvinylidene chloride or a mixture of two or more of these materials whereas both layers 3 between which is incorporated the film consist of the first material mentioned at the beginning of this specification, namely the thermoplastic polyurethane, block amide polyethers, flexible polyesters or any mixture thereof.

As in the foregoing embodiment the impervious film 2 is obtained with a bi-material injection press commonly used in the industry of thermoplastics transformation.

The thickness of this film may as was the case in the foregoing embodiment have a value lying between 10 microns and 200 microns.

With such a membrane structure, the gain in imperviousness is very substantial, i.e. of the order of 90% with respect to a conventional membrane made from polyurethane alone.

According to still another alternative embodiment the film 2 consists of a copolymer of ethylene and vinyl alcohol mixed with another material which may be the polyamide 6, blocks amides polyethers, terpolymers of ethylene, of acrylic ester and of maleic anhydride or other polymers of the same kind acting as an adhesive and this in a proportion of 5% to 20% with respect to the copolymer of ethylene and vinyl alcohol.

As to the layers 3 between which is incorporated the film 2, they consist of thermoplastic polyurethane.

The addition of another material such as defined hereinabove to the copolymer of ethylene and vinyl alcohol allows to obtain an outstanding adhering or adhesive bonding of the film 2 to the layers 3.

To manufacture the film 2 it is proceeded as stated in the foregoing embodiments, i.e. there is performed a mixing of the materials for a few minutes at a temperature between 150° C. and 250° C. Then the incorporation of the impervious film 2 between the layers 3 is carried out with a bi-material injection press of a type known per se.

The thickness of the film 2 should be relatively small and such as defined in the foregoing embodiments.

Here the gain in imperviousness of the membrane thus manufactured is very substantial with respect to the conventional membranes made by means of the thermoplastic polyurethane alone.

Another embodiment of a membrane according to this invention is described hereinafter.

Here the impervious film 2 may be made either from the second material cited at the beginning of this description, i.e. the copolymer of ethylene and vinyl alcohol, the polyamide, the polyvinylidene chloride or any mixture thereof, or from a mixture of this material with the other material stated previously, namely: polyamide 6, block amide polyethers, terpolymer of ethylene, of acrylic ester and of maleic anhydride or another polymer of the same king acting as an adhesive.

The film 2 is incorporated here between two layers of the material which may be either a block amide polyethers (PEBA) modified with a butadiene-styrene-acrylonitrile rubber (NBR) or a mixture of polyurethane and of a block amide polyethers modified with a butadiene-styrene-acrylonitrile rubber, this blending being possibly effected through mixing of both materials for a few minutes at a temperature between 150° C. and 250° C.

As was the case with the foregoing embodiments the incorporation of the impervious film 2 is carried out with a bi-material injection press, the thickness of this film being such as defined previously.

Here is again obtained a very substantial gain in imperviousness with respect to the conventional membranes made from thermoplastic polyurethane alone.

It should be pointed out that the materials used for the layers 3 of the membrane M provide to the latter additional advantages which are a better behaviour at the high temperature due to the incorporation of butadiene-styrene-acrilonitrile rubber (NBR) and a better adhesion or bonding of the film 2 to the layers 3 owing to the presence of the polyamide phase in these layers constituted partly of block amide polyethers.

Such a membrane may fit suspension spheres designed to resist temperatures which may reach a peak of 130° C. or 140° C.

Reverting to the graft polymer previously mentioned and constituting the membrane or a film such as 2 incorporated into this membrane it should be pointed out here that this graft polymer may be obtained through incorporation of the copolymer of ethylene and vinyl alcohol into the polyurethane during or at the end of the step of polymerization of the polyurethane.

This allows somewhat to obtain or to synthetize the graft polymer more directly than through a mixing operation only.

In such a way may be obtained upon the polymerization a graft polymer which is itself a mixable polyurethane rubber upon which have been grafted macromolecular chains of copolymer of ethylene and vinyl alcohol.

This material exhibits a gain in imperviousness to gases of 50% with respect to a non-grafted mixable polyurethane rubber.

As previously explained in connection with FIG. 1, this gain in imperviousness is obtained through the "labyrinth" effect due to the impervious islets of graft copolymer of ethylene and vinyl alcohol.

The aforesaid material which is a mixable polyurethane rubber grafted on molecular chains of copolymer of ethylene and vinyl alcohol may be molded to make a membrane for a suspension sphere by means of conventional techniques.

The advantage of this membrane is its behaviour at high temperature for instance of the order of 140° C.

It should be understood that the invention is not at all limited to the embodiments described and shown which have been given by way of illustrative example only.

On the contrary the invention comprises all the technical equivalents of the means described as well as their combinations if these are carried out according to its gist and within the scope of the appended claims.

What is claimed is:

1. An impervious resilient membrane adapted to fit a hydropneumatic accumulator and to be subjected on one side to the pressure of a gas and on the other side to the pressure of a liquid, said membrane comprising a first material and a second material in association, wherein said first material gives said membrane the required elasticity and is selected from the group consisting of thermoplastic polyurethanes, block amide polyethers, flexible polyesters and mixtures thereof, and wherein said second material is enclosed by said first material to provide imperviousness to said gas and is selected from the group consisting of copolymers of ethylene and vinyl alcohol, polyamides, polyvinylidene chloride and mixtures thereof.

2. A membrane according to claim 1, wherein said first material is a thermoplastic polyurethane and said second material is a copolymer of ethylene and vinly alcohol, and wherein said membrane is made by mixing said thermoplastic polyurethane and said copolymer of ethylene and vinyl alcohol to provide a graft polymer according to the reaction:

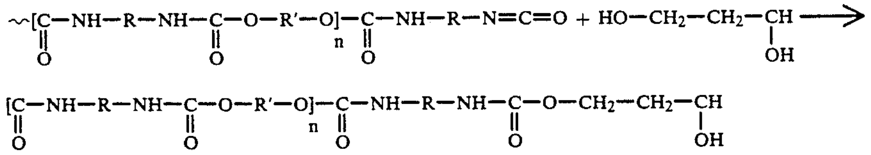

3. A membrane according to claim 1, wherein said first material is a thermoplastic polyurethane and said second material is a copolymer of ethylene and vinyl alcohol, and wherein the proportion of said second material with respect to said first material is from about 5% to about 20%.

4. A membrane according to claim 2, wherein said membrane comprises at least one film based on said graft polymer having a thickness between about 10 microns and about 200 microns and being arranged in sandwich-like fashion between at least two layers of said first material.

5. A membrane according to claim 4, wherein said graft polymer forming said film results from mixing said first and second materials in a proportion of about 50% to about 95% of said second material with respect to said first material.

6. A membrane according to claim 1, wherein said membrane comprises at least one film of said second material arranged in sandwich-like fashion between two layers of said first material.

7. A membrane according to claim 6, wherein said second material is a copolymer of ethylene and vinyl alcohol and is mixed with a third material selected from the group consisting of polyamide 6, block amide polyethers, and terpolymers of ethylene, acrylic ester, maleic anhydride and other polymers of the same type acting as an adhesive, in a proportion of about 5% to about 20% with respect to said second material.

8. A membrane according to claim 6, wherein said membrane comprises at least one film of said second material or a mixture of said second and third materials, said film being arranged in sandwich-like fashion between at least two layers of a material selected from the group consisting of block amide polyethers modified with a butadiene-styrene-acrylonitrile rubber and mixtures of polyurethane and block amide polyethers modified with a butadiene-styrene-acrylonitrile rubber.

9. A membrane according to claim 2, wherein said copolymer of ethylene and vinyl alcohol is incorporated into said thermoplastic polyurethane during the polymerization of said thermoplastic polyurethane to produce said graft polymer.

10. A membrane according to claim 9, obtained through molding of said graft polymer.

11. A hydropneumatic accumulator for instance of the spherical type the inner cavity of which is subdivided into two chambers one of which contains a gas and the other one of which contains a liquid, wherein said chambers are separated by a membrane according to claim 1.

12. A membrane according to claim 1, wherein said second material is embedded in said first material.

* * * * *